United States Patent
Qian et al.

(10) Patent No.: US 11,417,152 B2
(45) Date of Patent: Aug. 16, 2022

(54) VEHICLE PARKING SYSTEM AND METHOD

(71) Applicant: Carnegie Mellon University, Pittsburgh, PA (US)

(72) Inventors: Zhen Qian, Wexford, PA (US); Shuguan Yang, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 736 days.

(21) Appl. No.: 16/289,868

(22) Filed: Mar. 1, 2019

(65) Prior Publication Data

US 2019/0272682 A1    Sep. 5, 2019

Related U.S. Application Data

(60) Provisional application No. 62/710,845, filed on Mar. 1, 2018.

(51) Int. Cl.
*G07B 15/02* (2011.01)
*G08G 1/14* (2006.01)
*G06Q 10/02* (2012.01)

(52) U.S. Cl.
CPC ............ *G07B 15/02* (2013.01); *G06Q 10/02* (2013.01); *G08G 1/14* (2013.01)

(58) Field of Classification Search
CPC .......... G07B 15/02; G06Q 10/02; G08G 1/14; G08G 1/142; G08G 1/149
USPC ........................................................ 705/13
See application file for complete search history.

(56) References Cited

U.S. PATENT DOCUMENTS

| | | | | |
|---|---|---|---|---|
| 2014/0149153 | A1* | 5/2014 | Cassandras | G08G 1/14 705/5 |
| 2015/0138001 | A1* | 5/2015 | Davies | G08G 1/0175 340/932.2 |
| 2015/0221139 | A1* | 8/2015 | Bogaard | G08G 1/144 705/13 |
| 2017/0206473 | A1* | 7/2017 | Dermosessian | G06Q 50/30 |
| 2017/0278396 | A1* | 9/2017 | Rosen | G08G 1/13 |
| 2018/0096263 | A1* | 4/2018 | Modi | G06Q 10/02 |
| 2018/0137439 | A1* | 5/2018 | Galano Trivino | G06Q 10/00 |

(Continued)

OTHER PUBLICATIONS

Fox News, "App pays you to spot illegally parked cars" <https://www.foxnews.com/auto/app-pays-you-to-spot-illegally-parked-cars.print> (Oct. 2016) (Year: 2016).*

(Continued)

*Primary Examiner* — George Chen
*Assistant Examiner* — Brian A Tallman
(74) *Attorney, Agent, or Firm* — The Webb Law Firm

(57) ABSTRACT

Provided is a vehicle parking system for storing a plurality of vehicles in a plurality of parking spaces associated with a unique parking space identifier. The system includes a plurality of visual display devices each configured to display an indicator configured to visually represent at least two states and a vehicle identifier, each visual display device of the plurality of visual display devices arranged on or adjacent a corresponding parking space of the plurality of parking spaces. The vehicle parking system also includes a data storage device with parking space data, the parking space data including a plurality of parking space identifiers each associated with a status and a schedule.

20 Claims, 4 Drawing Sheets

(56) References Cited

U.S. PATENT DOCUMENTS

2020/0272950 A1* 8/2020 Xu ................... G06Q 10/06314

OTHER PUBLICATIONS

Lutino, "Vigilante app or helpful aid for accessible parking?" <https://www.myparkingpermit.com/blog/vigilante-app-helpful-aid-accessible-parking/> (<http://web.archive.org/web/20160816023332/https://www.myparkingpermit.com/blog/vigilante-app-helpful-aid-accessible-parking/> captured on Aug. 16, 2016) (Year: 2016).*

Nugraha, I. Gusti Bagus Baskara, and Felix Riady Tanamas. "Off-street parking space allocation and reservation system using event-driven algorithm." 2017 6th International Conference on Electrical Engineering and Informatics (ICEEI). IEEE, 2017. (Year: 2017).*

Glasnapp et al., "Understanding dynamic pricing for parking in Los Angeles: Survey and Ethnographic Results" In International Conference on HCI in Business, 2014, pp. 316-327, Springer.

Kaspi et al., "Parking reservation policies in one-way vehicle sharing systems", Transportation Research Part B, 2014, pp. 35-50, vol. 62.

Kaspi et al., "Regulating vehicle sharing systems through parking reservation policies: Analysis and performance bounds", European Journal of Operational Research, 2016, pp. 969-987, vol. 251.

Liu et al., "Expirable parking reservations for managing morning commute with parking space constraints", Transportation Research Part C, 2014, pp. 185-201, vol. 44.

Millard-Ball et al., "Is the curb 80% full or 20% empty? Assessing the impacts of San Francisco's parking pricing experiment", Transportation Research Part A, 2014, pp. 76-92, vol. 63.

Qian et al., "Optimal dynamic parking pricing for morning commute considering expected cruising time", Transportation Research Part C, 2014, pp. 468-490, vol. 48.

Qing-Feng et al., "Research on Public Parking Reservation System Based on SMS", 2011, pp. 636-643, ICTIS 2011 ASCE 2011.

Shibui et al., "Intelligent Parking Reservation Service on the Internet", Applications and the Internet Workshops, Proceedings, 2001 Symposium on, 2001, pp. 159-164.

Sun et al., "A Web-Based Parking Reservation System", 82nd Annual Meeting of the Transportation Research Board, 2003, 25 pages, Washington, DC.

Teodorovic et al., "Intelligent parking systems", European Journal of Operational Research, 2006, pp. 1666-1681, vol. 175.

Tsai et ao., "Evaluating parking reservation policy in urban areas: An environmental perspective", Transportation Research Part D, 2012, pp. 145-148, vol. 17.

Wang et al., "A Reservation-based Smart Parking System", Computer Communications Workshops (INFOCOM WKSHPS), 2011 IEEE Conference, 2011, pp. 690-695.

Yan et al., "CrowdPark: A Crowdsourcing-based Parking Reservation System for Mobile Phones", University of Massachusetts at Amherst Tech. Report, 2011, 14 pages.

Yan et al., "SmartParking: A Secure and Intelligent Parking System", IEEE Intelligent Transportation Systems Magazine, 2011, pp. 18-30, vol. 3, Issue 1.

Zheng et al., "Modeling and optimization of multimodal urban networks with limited parking and dynamic pricing", Transportation Research Part B, 2016, pp. 36-58, vol. 83.

* cited by examiner

VEHICLE PARKING SYSTEM AND METHOD

CROSS-REFERENCE TO RELATED APPLICATION

This application claims priority to U.S. Provisional Patent Application No. 62/710,845, filed Mar. 1, 2018, the disclosure of which is hereby incorporated by reference in its entirety.

GOVERNMENT LICENSE RIGHTS

This invention was made with Government support under National Science Foundation Grant No. CNS1544826. The Government has certain rights in the invention.

BACKGROUND

1. Field

This disclosure relates generally to parking vehicles and, in non-limiting embodiments, to a vehicle parking system and method for storing a plurality of vehicles in a plurality of parking spaces without using sensors.

2. Technical Considerations

Existing on-street parking systems are inefficient. Information regarding occupancies and violations are usually difficult to acquire, often requiring various sensing technologies. Such modern on-street parking management systems are not technically scalable because most parking sensors are unreliable, are subject to high costs for installing and maintaining, and are prone to wear. Moreover, parking rates are usually fixed, which is inefficient for system management as the actual parking demand can vary significantly from time to time. Even with systems that use sensors, enforcement is resource-intensive and difficult to implement. In addition, current parking reservations systems utilize humans, such as valet parking. This is also costly and inefficient. There is a need to develop a completely automated parking reservation system.

Accordingly, there is a need for technically improved systems and methods for storing a plurality of vehicles in a plurality of parking spaces that overcome at least some of these problems.

SUMMARY

According to non-limiting embodiments or aspects, provided is a vehicle parking system for storing a plurality of vehicles in a plurality of parking spaces, each parking space associated with a unique parking space identifier, the system comprising: a plurality of visual display devices each configured to display: (i) an indicator configured to visually represent at least two states and (ii) a vehicle identifier, each visual display device of the plurality of visual display devices arranged on or adjacent a corresponding parking space of the plurality of parking spaces; a data storage device comprising parking space data, the parking space data comprising a plurality of parking space identifiers each associated with a status and a schedule; and at least one processor in communication with the plurality of visual display devices, the data storage device, and a plurality of user devices, the at least one processor programmed or configured to: receive a plurality of reservation requests from user devices of the plurality of user devices, each reservation request comprising a start time and a duration, each reservation request associated with a vehicle identifier; receive a plurality of exit notifications, each exit notification associated with a parking space identifier and an exit time; in response to each exit notification of the plurality of exit notifications, modifying a status of the parking space identifier associated with the exit notification; in response to receiving a reservation request of the plurality of reservation requests or an exit notification of the plurality of exit notifications, determine an optimized parking schedule based on the status of the plurality of parking space identifiers and the schedule of the plurality of parking space identifiers; update the parking space data based on the optimized parking schedule; and control the plurality of visual display devices based on the updated parking space data, the indicator of a visual display device is controlled to a first state in response to a corresponding parking space identifier being associated with a current available time period based on the corresponding schedule in the parking space data and to a second state in response to the corresponding parking space identifier being associated with an unavailable time period based on a corresponding schedule in the parking space data, and wherein each visual display device corresponding to a parking space identifier associated with a current scheduled time period is configured to display a vehicle identifier associated with the current scheduled time period.

In non-limiting embodiments or aspects, the first state comprises a first color and the second state comprises a second color. In non-limiting embodiments or aspects, the status is based on whether the corresponding parking space is occupied. In non-limiting embodiments or aspects, the at least one processor is further programmed or configured to: receive at least one violation notification from at least one user device of the plurality of user devices, the at least one violation notification identifying a parking space identifier and a vehicle identifier; in response to input affirming the at least one violation notification, associating at least one benefit with an account corresponding to the at least one user device. In non-limiting embodiments or aspects, the vehicle identifier displayed by each visual display device of the plurality of visual display devices comprises at least a portion of a license plate number.

In non-limiting embodiments or aspects, the current available time period for a parking space identifier comprises a predetermined length of time during which the parking space identifier is not associated with any reservations. In non-limiting embodiments or aspects, the at least one processor is further programmed or configured to determine a parking cost for a specified time period based on the plurality of reservation requests and the plurality of exit notifications. In non-limiting embodiments or aspects, the indicator of each visual display device comprises a color of the vehicle identifier, such that the first state comprises the vehicle identifier displayed in a first color, and the second state comprises the vehicle identifier displayed in a second color.

According to non-limiting embodiments or aspects, provided is a method for storing a plurality of vehicles in a plurality of parking spaces, each parking space associated with a unique parking space identifier, wherein each parking space of the plurality of parking spaces comprises a visual display device configured to display an indicator configured to visually represent at least two states and a vehicle identifier, the method comprising: storing parking space data in a data storage device, the parking space data comprising a plurality of parking space identifiers each associated with a status and a schedule; receiving a plurality of reservation requests from user devices of the plurality of user devices, each reservation request comprising a start time and a duration, each reservation request associated with a vehicle identifier; receiving a plurality of exit notifications, each exit notification associated with a parking space identifier and an exit time; in response to each exit notification of the plurality of exit notifications, modifying a status of the parking space identifier associated with the exit notification; in response to receiving a reservation request of the plurality of reservation requests or an exit notification of the plurality of exit notifications, determining an optimized parking schedule based on the status of the plurality of parking space identifiers and the schedule of the plurality of parking space identifiers; updating the parking space data based on the optimized parking schedule; and controlling the plurality of visual display devices based on the updated parking space data, the indicator of a visual display device is controlled to a first state in response to a corresponding parking space identifier being associated with a current available time period based on the corresponding schedule in the parking space data and to a second state in response to the corresponding parking identifier being associated with an unavailable time period based on the corresponding schedule in the parking space data, and wherein each visual display device corresponding to a parking space identifier associated with a current scheduled time period is configured to display a vehicle identifier associated with the current scheduled time period.

In non-limiting embodiments or aspects, the first state comprises a first color and the second state comprises a second color. In non-limiting embodiments or aspects, the status is based on whether the corresponding parking space is occupied. In non-limiting embodiments or aspects, the at least one processor is further programmed or configured to: receive at least one violation notification from at least one user device of the plurality of user devices, the at least one violation notification identifying a parking space identifier and a vehicle identifier; in response to input affirming the at least one violation notification, associating at least one benefit with an account corresponding to the at least one user device. In non-limiting embodiments or aspects, the vehicle identifier displayed by each visual display device of the plurality of visual display devices comprises at least a portion of a license plate number.

In non-limiting embodiments or aspects, the current available time period for a parking space identifier comprises a predetermined length of time during which the parking space identifier is not associated with any reservations. In non-limiting embodiments or aspects, the at least one processor is further programmed or configured to determine a parking cost for a specified time period based on the plurality of reservation requests and the plurality of exit notifications. In non-limiting embodiments or aspects, the indicator of each visual display device comprises a color of the vehicle identifier, such that the first state comprises the vehicle identifier displayed in a first color, and the second state comprises the vehicle identifier displayed in a second color.

According to non-limiting embodiments or aspects, provided is a computer program product for storing a plurality of vehicles in a plurality of parking spaces, each parking space associated with a unique parking space identifier, wherein each parking space of the plurality of parking spaces comprises a visual display device configured to display an indicator configured to visually represent at least two states and a vehicle identifier, comprising at least one non-transitory computer-readable medium including program instructions that, when executed by at least one processor, cause the at least one processor to: storing parking space data in a data storage device, the parking space data comprising a plurality of parking space identifiers each associated with a status and a schedule; receive a plurality of reservation requests from user devices of the plurality of user devices, each reservation request comprising a start time and a duration, each reservation request associated with a vehicle identifier; receive a plurality of exit notifications, each exit notification associated with a parking space identifier and an exit time; in response to each exit notification of the plurality of exit notifications, modify a status of the parking space identifier associated with the exit notification; in response to receiving a reservation request of the plurality of reservation requests or an exit notification of the plurality of exit notifications, determine an optimized parking schedule based on the status of the plurality of parking space identifiers and the schedule of the plurality of parking space identifiers; update the parking space data based on the optimized parking schedule; and generate at least one user interface on at least one user device of the plurality of user devices based on the updated parking space data, wherein the at least one user interface displays a first state in response to a corresponding parking space identifier being associated with a current available time period based on a corresponding schedule in the parking space data and a second state in response to the corresponding parking identifier being associated with an unavailable time period based on the corresponding schedule in the parking space data, and wherein the at least one user interface displays a vehicle identifier for each parking space identifier associated with a current scheduled time period.

In non-limiting embodiments or aspects, the first state comprises a first color and the second state comprises a second color. In non-limiting embodiments or aspects, the status is based on whether the corresponding parking space is occupied. In non-limiting embodiments or aspects, the program instructions further cause the t least one processor to: receive at least one violation notification from at least one user device of the plurality of user devices, the at least one violation notification identifying a parking space identifier and a vehicle identifier; in response to input affirming the at least one violation notification, associate at least one benefit with an account corresponding to the at least one user device.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments that are illustrated in the accompanying schematic figures, in which.

DESCRIPTION

Figure 1:
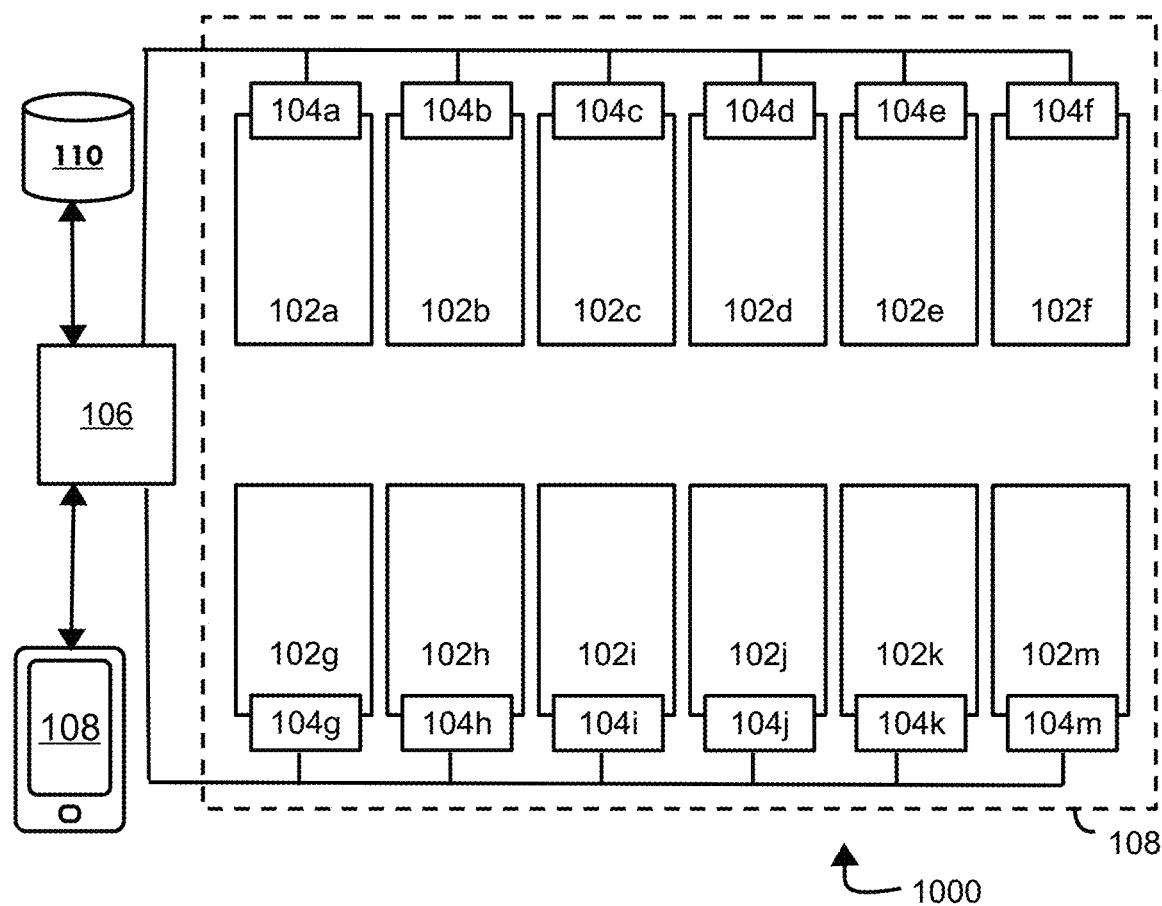
FIG. 1 is a schematic diagram of a vehicle parking system according to non-limiting embodiments.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings and described in the following specification, are simply exemplary embodiments or aspects of the invention. Hence, specific dimensions and other physical characteristics related to the embodiments or aspects disclosed herein are not to be considered as limiting.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

As used herein, the term "computing device" may refer to one or more electronic devices configured to process data. A computing device may, in some examples, include the necessary components to receive, process, and output data, such as a display, a processor, a memory, an input device, and a network interface. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may also be a desktop computer or other form of non-mobile computer. An "Application Programming Interface" (API) refers to computer code or other data stored on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, etc.).

Non-limiting embodiments of the present disclosure are directed to a vehicle parking system and method for storing a plurality of vehicles in a plurality of parking spaces without the need to deploy sensors for detecting the presence or absence of vehicles. Non-limiting embodiments therefore allow for the vehicle parking system to be implemented in a variety of different parking regions, such as parking structures, lots, on-street parking spaces, or the like, without having to install expensive equipment or embed sensors in the parking spaces. By using a combination of visual display devices associated with each parking space, a parking server, and the management of reservation requests and exit notifications, non-limiting embodiments allow for an improved vehicle parking system that uses fewer hardware resources and therefore experiences fewer errors, maintenance requirements, and downtime. Further, in some non-limiting embodiments, the unique arrangement of the vehicle parking system also enables for reliable and efficient enforcement of unauthorized vehicles.

Referring now to FIG. 1, a vehicle parking system 1000 is shown according to a non-limiting embodiment. The vehicle parking system 1000 includes a parking region 108 having a plurality of parking spaces 102*a-m* associated with a plurality of visual display devices 104*a-m*. The parking region 108 may include one or more parking structures (e.g., a parking garage), a parking lot, on-street parking areas, and/or any other like area or structure having one or more parking spaces. In non-limiting embodiments in which there are a plurality of parking regions 108, the parking regions 108 may be local and/or remote from each other.

With continued reference to FIG. 1, the vehicle parking system 1000 includes a plurality of visual display devices 104*a-m* arranged within or adjacent each parking space 102*a-m*. For example, the visual display devices 104*a-m* may be arranged on a pole or other structure adjacent a parking space, may be fixed to a wall adjacent a parking space, may be embedded into the parking space itself, may be embedded into a curb, and/or the like. In non-limiting embodiments, the visual display devices 104*a-m* include one or more light emitting diodes (LEDs), liquid crystal displays (LCDs), monitors, projectors, and/or any other like devices capable of displaying information. In non-limiting embodiments, each visual display device 104*a-m* is configured to display an indicator representing at least two states. For example, an indicator may be one or more LEDs that can display different colors for different states. Each visual display device 104*a-m* may also be configured to display a vehicle identifier, such as at least a portion of a license plate number, vehicle make and year, an image of a vehicle, and/or the like. Each visual display device 104*a-m* may also be configured to display a parking space identifier for the parking space. In some non-limiting embodiments, the indicator may be a color of the text of the displayed vehicle identifier. As will be explained herein, in other non-limiting embodiments, a single parking kiosk for a parking region and/or web/mobile applications on user devices may be used instead of, or in addition to, the visual display devices 104*a-m*.

Still referring to FIG. 1, the vehicle parking system 1000 includes a parking server 106, which may include any computing device that is remote or local to the parking region 108. The parking server 106 may be in communication with each of the visual display devices 104*a-m*. In some non-limiting embodiments, the visual display devices 104*a-m* may be in local communication with a network appliance and, through the network appliance, in communication with a remote parking server 106 via one or more public or private networks, such as the Internet, a dedicated network, and/or the like. Each visual display device 104*a-m* may communicate directly with the parking server 106 or, in other examples, may be arranged in a mesh network such that the visual display devices 104*a-m* communicate with the parking server 106 via one or more of the other visual display devices 104*a-m*. One or more computing devices 108, such as mobile devices and/or parking kiosks, are in communication with the parking server 106 via one or more networks. The computing devices 108 may be provisioned with a software application configured for communicating with the parking server 106 via an API or any other means. In some non-limiting embodiments, the software application may be a dedicated application or a web browser application that displays and formats data from server-side software executed by the parking server 106. Various other arrangements are possible.

With continued reference to FIG. 1, the vehicle parking system 1000 also includes a data storage device 110 that has parking space data stored thereon. The parking space data may be arranged in one or more data structures and may include parking space identifiers associated with a status and a schedule. The parking space identifiers may be unique values identifying a particular parking space from a plurality of parking spaces. The status of each parking space identifier may include whether the corresponding parking space is currently occupied, unoccupied (e.g., vacant), reserved, and/or the like. The schedule of each parking space may include dates and times during which the corresponding parking space is intended to be occupied, unoccupied, reserved, and/or the like.

Figure 2:
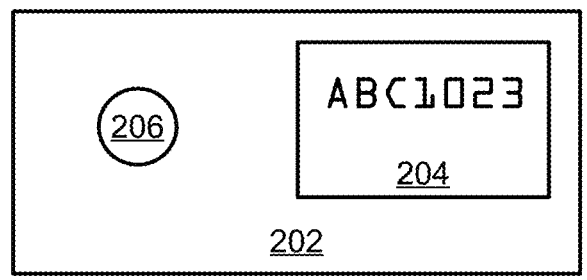
FIG. 2 is a schematic diagram of a visual display device for a vehicle parking system according to non-limiting embodiments.

Referring now to FIG. 2, a visual display device 202 is shown according to a non-limiting embodiment. The visual display device 202 includes a visual indicator 206 and a vehicle identifier display 204. The visual display device 202 may be a single monitor display, multiple monitor displays, an arrangement of LEDs and/or LCDs, and/or any other like device capable of displaying information. The indicator 206 and vehicle identifier 204 may be portions of the same or separate displays. In the non-limiting embodiment shown in FIG. 2, the visual indicator 206 is one or more LEDs that may have a plurality of states, such as different colors and/or display patterns. In other examples, the visual indicator 206 may include text, a color of text (e.g., a color of the vehicle identifier 204), and/or the like. The states may represent whether the corresponding space is intended to be occupied at that time or at a time in the near future, whether the corresponding space is unoccupied and is available for an unreserved parker, and/or the like.

In some examples, and with continued reference to FIG. 2, a combination of colors, text, and numerals may be used to display a state. For example, a vacancy state may indicate that a parking space is vacant and a duration for such a vacancy may be displayed in a first color (e.g., green). The vacancy state may be commenced in response to a duration of availability being at least as long as a predetermined time period, such as 15 minutes, 30 minutes, or the like. A reserved state may indicate that a parking space is reserved and may include a duration of such a reservation in a second color (e.g., red). A reserved state may also be accompanied by a display of the vehicle identifier, such as a license plate number (e.g., "ABC1023") or portion thereof, an image of a vehicle, or the like, by the vehicle identifier display 204. A reserved state may display the vehicle identifier in a color (e.g., red) and may be commenced a predetermined time period (e.g., 15 minutes) before a reserved parking session commences. The duration, vehicle identifier, and/or indicator may change to a vacancy state when the reserved period ends. A paid state may be commenced in response to a determination that a parking space is occupied by a non-reserved parker, and may include a display of the duration and/or vehicle identifier in one or more colors (e.g., red).

In non-limiting embodiments, the vehicle identifier display 204 displays a vehicle identifier corresponding to a vehicle that has reserved the corresponding parking space (e.g., corresponding to a parking space identifier). As an example, possible displays of a visual display device 202 may include "60 minutes" in a first color (e.g., green) to indicate that the space is available or the next 60 minutes, "Paid ABC1023" in a second color (e.g., red) to indicate that the space is currently paid for and/or occupied by a vehicle corresponding to the vehicle identifier ABC1023, or "Reserved ABC1023" in the second color (e.g., red) to indicate that the space is currently reserved by a vehicle corresponding to the vehicle identifier ABC1023.

Figure 3:
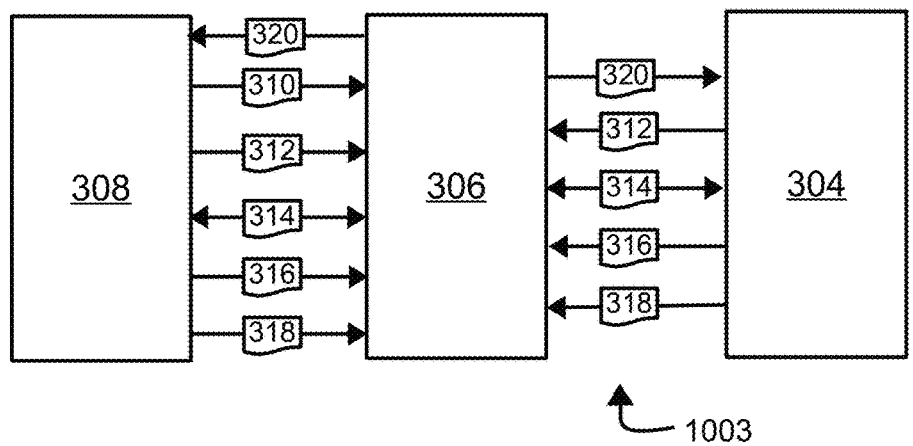
FIG. 3 is a schematic diagram of a vehicle parking system according to non-limiting embodiments.

Referring now to FIG. 3, a vehicle parking system 1003 is shown according to a non-limiting embodiment. A parking server 306 is in communication with a user device 308 and a parking kiosk 304. The parking server 306 may be configured to handle requests sent from parking kiosks 304 as well as mobile and/or web applications executing on user devices 308. For example, the parking server 306 may process payments and reservations, predict parking space occupancy and vacancy, dynamically determine parking rates, communicate updated parking space data to parking kiosks 304 and/or user devices 308, assign parking spaces to upcoming reservations, communicate notifications to parking kiosks 304 and/or user devices 308, process refunds, process violation notifications, and/or the like. A parking kiosk 304 may be located at an entrance or exit of a parking region or, in other examples, may be located on or adjacent each parking space or a section of parking spaces in a parking region. A parking kiosk may include a computing device with a visual display device and an input device, such as a touchscreen, buttons, a credit card reader, and/or the like. It will be appreciated that, in non-limiting embodiments, only user devices 308, only parking kiosks 304, or both user devices 308 and parking kiosks 304 may be used. A parking kiosk may include, or be associated with, a large visual display device that displays parking data for a plurality of parking spaces in the parking region.

In non-limiting embodiments, a parking kiosk may include a GUI and a credit card reader. The parking kiosk may communicate with the parking server via a cellular network (i.e., LTE), WiFi®, cable, or the like. A user may enter his/her license plate number or some other vehicle identifier into the kiosk through a keyboard or touchscreen. A user may also indicate which parking space was used or is intended to be used by selecting a parking space identifier, which may be displayed on a map of the parking region. For a user that already has a reservation, the user may check-in on the kiosk to confirm that the user is intending to use the parking space. The parking kiosk may also display pricing information, including dynamic parking rates. In non-limiting embodiments, the parking kiosk may be waterproof, moisture-proof, and/or temperature resistant for placement outdoors or in unprotected areas.

With continued reference to FIG. 3, the parking server 306 may communicate parking space data 320 to the user device 308 and/or parking kiosk 304, such as updated pricing information, status information, and/or the like. The parking space data 320 may be communicated upon request, at regular intervals, in response to being changed or modified, and/or the like, such that the user device 308 and/or parking kiosk 304 has access to real-time or near-real-time parking space data 320. The user device 308 may also communicate reservation requests 310 to the parking server identifying a vehicle identifier and a date, time, and duration for the reservation request. In non-limiting embodiments, the parking kiosk 304 may also be used to make reservations.

Still referring to FIG. 3, both the user device 308 and parking kiosk 304 may communicate non-reserved transaction requests 312 to store vehicles in parking spaces that are available for parking. In some non-limiting embodiments, check-in data 314 may be communicated between the parking server 306 and the user device 308 and/or parking kiosk 304. The check-in data 314 may be used by reserved parkers to look up an assigned parking space and/or by the parking server 306 to notify the user device 308 and/or parking kiosk 304 of such data. In some non-limiting embodiments, the user device 308 and/or parking kiosk 304 may communicate an exit notification 316 indicating that a vehicle is checking-out of a parking space. In some non-limiting embodiments, a violation notification 318 may be communicated from the user device 308 and/or parking kiosk 304 to report a parking infraction.

In non-limiting embodiments, an exit notification 316 may be communicated to the parking server when a vehicle vacates a parking space and/or parking region. The exit notification 316 may be automatically communicated by a user device 308 or, in other examples, may be communicated in response to user input through a user device 308 or parking kiosk 304. For example, if a user decides to leave 30 minutes earlier than originally scheduled, the user may have the option to communicate an exit notification 316 by selecting an input option (e.g., a button, touchscreen, etc.) on a parking kiosk 304, application running on a user device, and/or visual display device associated with the parking space. In some non-limiting embodiments, the parking server may determine a refund amount in response to an exit notification to reward the user for exiting the parking space early and creating a vacancy. For example, a user may receive a percentage (e.g., 50%, 60%, 70%, 80%, etc.) of the amount paid for parking in the remaining period, in response to which the visual display device may display that the space is available for a duration. In non-limiting embodiments, with increased demand for parking, users may be notified and/or incentivized to vacate early.

In non-limiting embodiments, users may register an account with the parking server 306. For example, through a mobile and/or web application executing on a user device 308 or a parking kiosk 304, a user may register an account and associate the account with payment information, one or more vehicle identifiers, one or more preferred parking regions, one or more preferred parking schedules, and/or the like. A user may be prompted to register an account in response to using the vehicle parking system for the first time and/or in response to the parking server 306 determining that the vehicle identifier has never been used before. A user account may be associated with a user's name, telephone number, email address, payment information, vehicle identifier, and/or the like.

In non-limiting embodiments, a reservation request 310 may be associated with an additional fee. The reservation request 310 may include a starting time and a duration. In some examples, the reservation request 310 may also include an identifier for a parking region if there are several possible parking regions, a vehicle identifier for the vehicle that the user intends to park, payment information, account information, and/or the like. In response to receiving a reservation request 310, the parking server 306 may determine a parking space identifier to assign to the request. The determination of a parking space identifier may be immediately in response to receiving the reservation request or, in other examples, may be performed a predetermined time before the reservation commences (e.g., 15 minutes). In response to a parking space identifier being determined and assigned to a request and vehicle identifier, the corresponding visual display device for the parking space may be updated to show the vehicle identifier and a reserved state, such as a vehicle identifier in a color (e.g., red). The user device 308 may also receive a notification, such as a push notification, text message, or the like, conveying the parking space identifier. A user device 308 may also receive other notifications, such as an expiration notification when a parking session is about to expire. In such examples, the user device 308 may present options to extend the parking session if available or to reserve a different parking space.

In non-limiting embodiments, the parking server 306 assigns parking space identifiers to reservation requests 310 based on one or more algorithms. The parking spaces may be assigned dynamically based on current and/or historical parking data to avoid a fragmented parking scheme. In this way, the number of parking spaces that are available for a duration may be optimized to allow for a greater number of parkers. For example, the parking server may allocate parking spaces by associating parking space identifiers with vehicle identifiers and/or reservation requests, such that reservations for any particular parking space are spaced temporally close together or temporally far apart, avoiding medium-sized gaps (e.g., 15 minutes to 30 minutes) that are unlikely to be used by most parkers. Because such medium-sized time slots are unlikely to be convenient for most parkers, those users may have to find another parking region or return to the parking region to move their vehicles when the time slot has expired. One or more algorithms may receive, as inputs, reservation requests, existing reservations, non-reserved parking data 312, exit notifications 314, and/or violation notifications 318. Based on this data, fragmented time slots (e.g., time slots between occupancy that are less than a predetermined duration, such as 15-30 minutes) may be merged to create larger time slots while still satisfying the existing number of reservations. In non-limiting embodiments, the optimization algorithm may optimize the allocation of spaces for one of any number of objectives. For example, the algorithm may optimize to maximize parking revenue, the algorithm may optimize to minimize the total walking distance for users to their destinations, the algorithm may optimize for minimizing traffic congestion within the parking region, the algorithm may optimize to reduce cruising time and/or emissions, the algorithm may optimize for a combination of such objectives, and/or the like.

In some non-limiting embodiments, a reservation request may specify a physical location or destination (e.g., "Building A" or a street address), one or more acceptable parking regions at which the user is willing to park, and/or a parking rate range or ceiling (e.g., a maximum cost per hour or day). In such examples, the parking server may determine an optimal reservation for the user that is within the parking rate range, if possible, and is the closest distance to the physical location or destination. In this manner, the parking server can optimize parking space allocations and reservations for users across multiple parking regions.

Figure 4A:
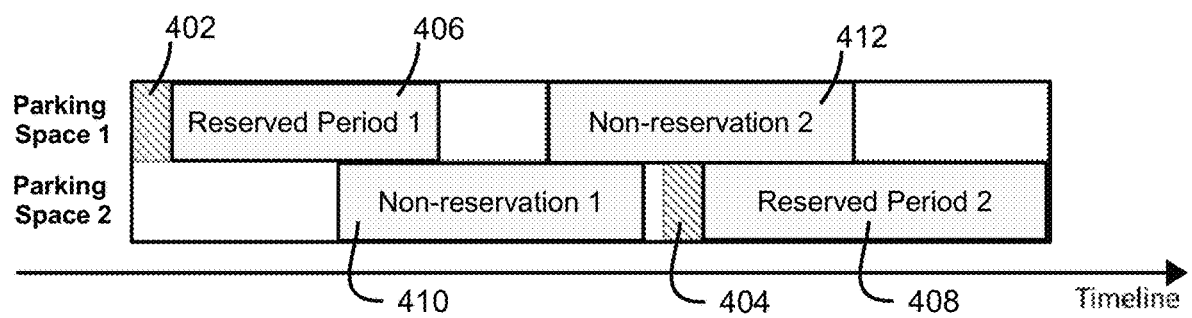
FIGS. 4A and 4B are parking space allocations for a vehicle parking system according to non-limiting embodiments.
Figure 4B:
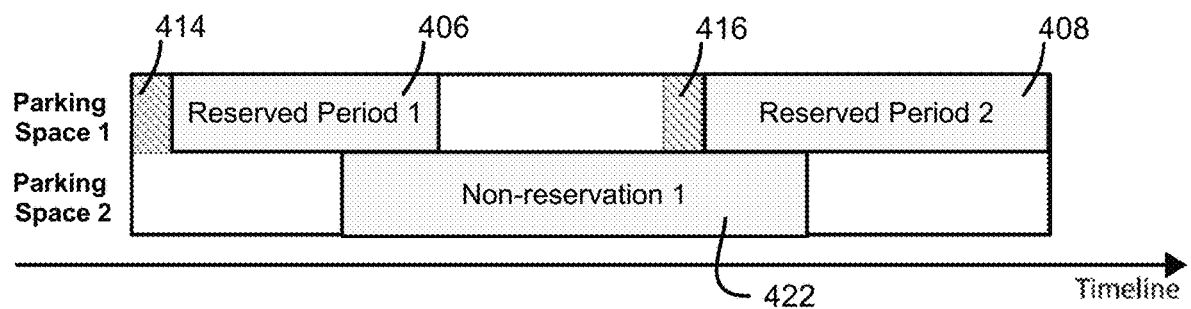

Referring now to FIGS. 4A and 4B, example parking space allocations are shown according to non-limiting embodiments. The examples shown in FIGS. 4A and 4B concern two parking spaces to illustrate non-limiting embodiments of a vehicle parking system and method, although it will be appreciated that similar steps may be carried out to optimize parking space allocation with any number of parking spaces. The time gap periods 402, 404, 414, 416 shown in FIGS. 4A and 4B represent a predetermined time period (e.g., 15 minutes) that precedes each reservation period 406, 408. The non-reservation periods 410, 412, 422 represent occupancy of the parking spaces that were not reserved in advance. Depending on the actual non-reservation data received by the system in real-time, an optimization algorithm may be used to allocate spaces to the two reservations differently. FIG. 4A shows an optimized allocation of parking spaces if non-reservation periods 410 and 412 were actually requested. In this case, reserved period 408 would be assigned to a different parking space from reserved period 406 in order to accommodate both non-reserved periods 410 and 412. If non-reserved period 422 was requested instead of both non-reserved periods 410 and 412, as shown in FIG. 4B, then reserved periods 406 and 408 may be assigned to the same parking space in order to accommodate non-reservation period 422. Here, it is demonstrated that the space allocation of reserved periods 406 and 408 are optimized with respect to the requests received in real-time.

In non-limiting embodiments, the parking server 306 may determine a dynamic parking rate to maximize the usage of the parking spaces in a parking region. An optimal parking occupancy may be, for example, 100% (e.g., full), 80-90% (e.g., mostly full but with room for non-reserved parkers), or any other percentage that is determined to optimize revenue, convenience, traffic, social welfare for region, or any combination. For example, the dynamic parking rate may utilize a current demand for a time period, a historical demand for a time period, scheduled events for a time period, and/or the like. When a user communicates a reservation request 310, the parking server 306 determines a parking rate for the requested time period. In this manner, a user that is paying to reserve a parking space may be enabled to secure a lower rate in advance and the rate may increase with demand and time. In some examples, the parking rate may decrease if the real-time occupancy is lower than predicted. In non-limiting embodiments, parking rates may have fixed base rates that are dependent on time and/or duration. For example, the operating hours of a parking region may be divided into a plurality of time periods, each of which is associated with a base parking rate according to a predefined schema and/or historical occupancy data. Dynamic pricing may be implemented instead of or in addition to the base parking rate. For example, dynamic parking rates may result in the adjustment of a base parking rate based on an actual demand.

In non-limiting embodiments, the parking server 306 receives and processes violation notifications 318 to enforce compliance with reservations and assigned parking spaces. Violation notifications 318 may be received from user devices 308 and/or parking kiosks 304. Each violation notification 318 may identify a parking space identifier and a vehicle identifier, as input by a user. A user may input such information by manually inputting the information or, in other examples, capturing an image of the vehicle and/or parking space with a camera of a user device 308. A violation notification 318 may be communicated by a user having a reserved parking space that is occupied by another vehicle and/or other users that enforce compliance by comparing information on a visual display device with the vehicle that is currently occupying a corresponding parking space.

In non-limiting embodiments, a user with a reserved parking space occupied by another vehicle may, in response to submitting a violation notification 318, be assigned a new parking space by the parking server 306 or may find a vacant parking space. The user may also receive compensation, such as a refund, a credit, and/or the like. Moreover, in some non-limiting embodiments, if the user parks elsewhere without reporting the violation, that user may possibly be reported as a violation for parking in the incorrect parking space. For users that report parking violations that are not their own assigned parking space, the parking server 306 may reward such users with a form of compensation, such as a credit usable for parking. In this manner, enforcement may be crowd-sourced to other users by providing an incentive to submit violation notifications 318. The parking server 306, in response to receiving one or more violation notifications, may automatically notify an enforcement officer to investigate the reported violation. In some non-limiting embodiments, the parking server may process each violation notification to determine if it is valid based on the information contained therein prior to notifying an enforcement officer. Rewards for reporting users may be provided in response to an enforcement officer verifying the violation. The visual display devices associated with each parking space may enable such enforcement by identifying each reserved parking space with a color (e.g., red) and a vehicle identifier. In this manner, users may visually compare the vehicle identifier on the visual display device with the vehicle occupying the parking space. In some non-limiting embodiments, vacant spaces may be identified with another color (e.g., green) and may also indicate a violation of a vehicle parked in a parking space that should be vacant.

Users seeking to park their vehicles without a reservation may utilize the visual display devices to identify available parking spaces. For example, non-reserved users may be permitted to park at any parking space identified by a first color (e.g., green) or other visual indicator. In some examples, the available duration is displayed as the color or in addition to the color. A user that parks in the parking space may then input their vehicle identifier into an application on a user device 308 or a parking kiosk 304. The user may also input a parking space identifier or, in other examples, the parking space identifier may be automatically determined. The maximum duration a non-reserved user is allowed to park may be restricted by incoming reservation requests, and the duration may be displayed. For example, if there is a reservation assigned to a parking space 60 minutes in the future, the non-reserved user may only be permitted to park in the parking space for up to 45 minutes (e.g., the available time less a predetermined time gap). The parking server 306 may optimize parking space allocations to provide the longest possible duration for current users that are parked and/or in response to a request for a user to extend a parking duration.

Figure 5:
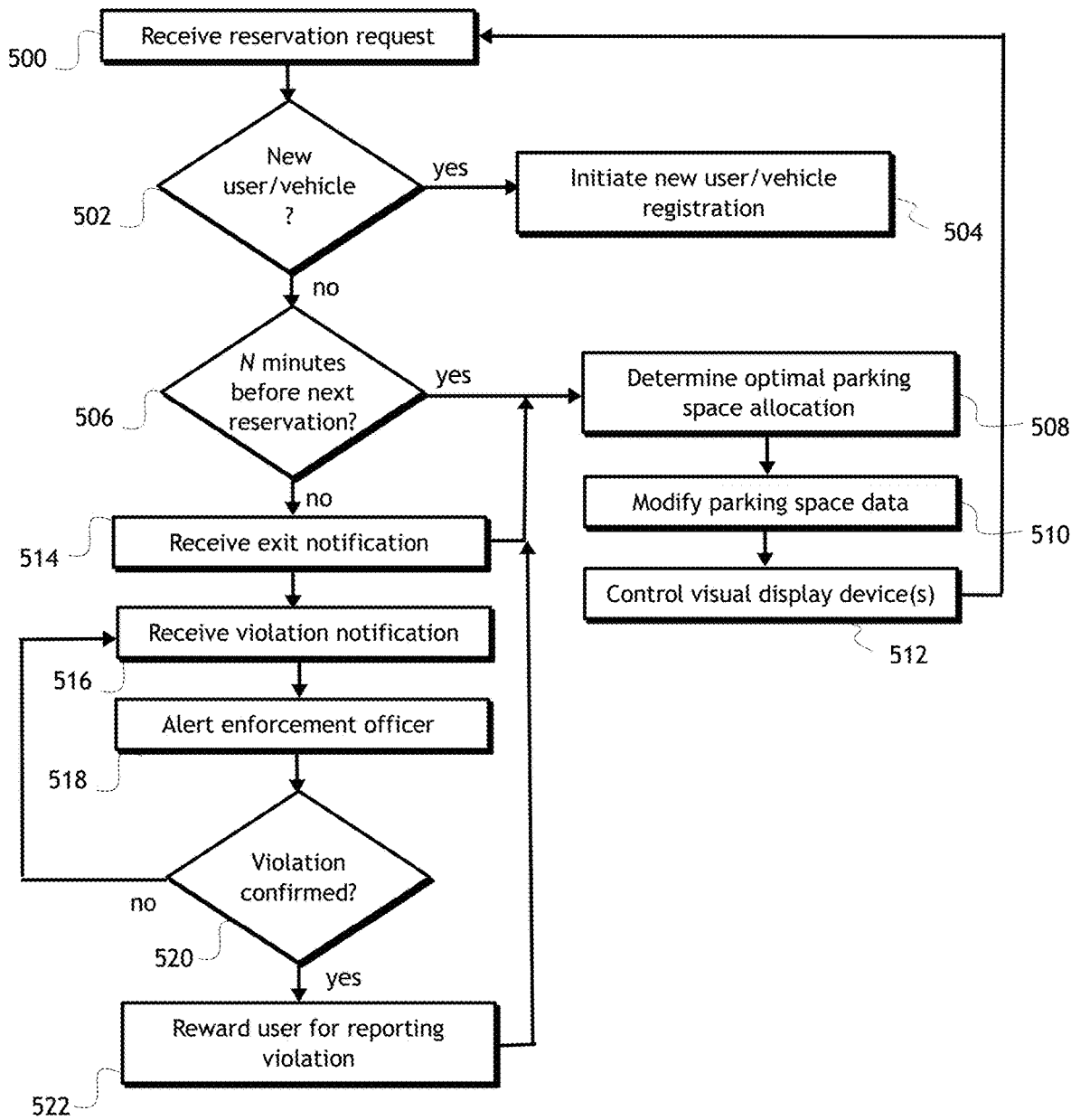
FIG. 5 is a flow diagram for a vehicle parking method according to non-limiting embodiments.

Referring now to FIG. 5, a flow diagram for a vehicle parking method is shown according to a non-limiting embodiment. It will be appreciated that the flow diagram is shown for exemplary purposes only and that the method may include fewer, additional, and/or different steps, and that the steps may be performed in any order. At an initial step 500, a reservation request is received by a parking server. As explained herein, a reservation request may include a vehicle identifier and a date and time for a desired reservation. At step 502, the parking server determines if the user and/or vehicle is new to the system. If the user and/or vehicle is new to the system or any information has changed, the method may proceed to step 504 in which the parking server initiates a new user or new vehicle registration. At step 506, it is determined if a next reservation is beginning within a predetermined time period (e.g., N minutes, such as 15 minutes). If a next reservation is beginning within a predetermined time period, the method proceeds to step 508 to determine an optimized parking space allocation. After an optimized parking space allocation is determined for the parking region, the method proceeds to step 510 in which parking space data is modified to reflect the new, optimized parking space allocations. At step 512, the visual display devices associated with any parking spaces for which parking space data has changed are controlled to display the updated parking space data. After step 512, the method may return to step 500 and/or may proceed to steps 514 and/or 516. If it is determined that a next reservation is not beginning within the predetermined time period, the method may proceed to steps 514 and/or 516. It will be appreciated that steps 514 and/or 516 may also be performed after any other step, before step 506, concurrently with step 506 or other steps, in response to receiving data, and/or the like.

At step 514, an exit notification is received by the parking server. It will be appreciated that an exit notification may be received at any time. In response to receiving an exit notification, the method may automatically proceed to step 508 in which the parking server determines an optimal parking space allocation for the parking region based on the newly-available parking space. In some non-limiting embodiments, the method may proceed to step 508 after also determining that the user sending the exit notification is vacating the parking space earlier than a predetermined time period (e.g., 15 minutes, 30 minutes, etc.) preceding the user's original expiration time for the parking space. After an optimized parking space allocation is determined for the parking region, the method proceeds to step 510 in which parking space data is modified to reflect the new, optimized parking space allocations. At step 512, the visual display devices associated with any parking spaces for which parking space data has changed are controlled to display the updated parking space data. After step 512, the method may return to step 500 and/or may proceed to step 516.

At step 516 of FIG. 5, the parking server receives a violation notification from a user. In response to receiving a violation notification, the parking server automatically communicates an alert to an enforcement officer at step 518. An enforcement officer may confirm or reject a violation notification following an investigation. At step 520, the parking server determines if the enforcement officer has confirmed the violation notification. If the enforcement officer confirmed the violation notification, the method may proceed to step 522 in which the parking server rewards the user that submitted the violation notification such as, for example, associating a credit to the user's account. The method may then proceed to step 508 such that an optimal parking space allocation is determined to account for the presence of the unauthorized vehicle. If the enforcement officer did not confirm the violation notification at step 520, or affirmatively rejected the notification, the method may proceed to step 516 for the next violation notification and/or to step 500 to start over.

Figure 6:
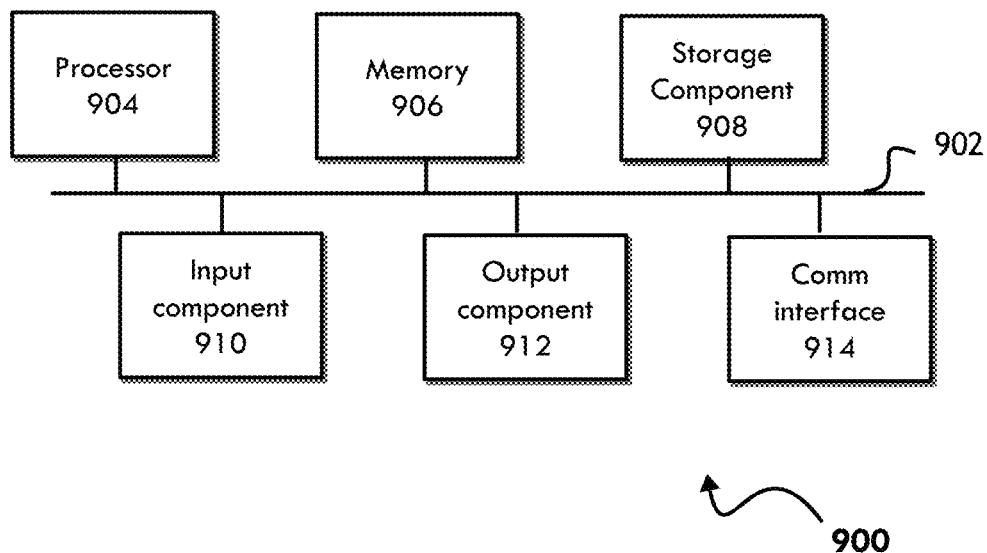
FIG. 6 illustrates example components of a device used in connection with non-limiting embodiments.

Referring now to FIG. 6, shown is a diagram of example components of a device 900 according to non-limiting embodiments. Device 900 may correspond to the parking server 306, user device 308, and/or parking kiosk 304 shown in FIG. 3, as examples. In some non-limiting embodiments, such systems or devices may include at least one device 900 and/or at least one component of device 900. The number and arrangement of components shown in FIG. 6 are provided as an example. In some non-limiting embodiments, device 900 may include additional components, fewer components, different components, or differently arranged components than those shown in FIG. 3. Additionally, or alternatively, a set of components (e.g., one or more components) of device 900 may perform one or more functions described as being performed by another set of components of device 900.

As shown in FIG. 6, device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 6, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A vehicle parking system for storing a plurality of vehicles in a plurality of parking spaces, each parking space associated with a unique parking space identifier, the system comprising:
    a plurality of visual display devices each configured to display: (i) an indicator configured to visually represent at least two states and (ii) a vehicle identifier, each visual display device of the plurality of visual display devices arranged on or adjacent a corresponding parking space of the plurality of parking spaces;
    a data storage device comprising parking space data, the parking space data comprising a plurality of parking space identifiers each associated with a status and a schedule; and
    at least one processor in communication with the plurality of visual display devices, the data storage device, and a plurality of driver user devices, the at least one processor programmed or configured to:
        receive a plurality of reservation requests from driver user devices of the plurality of driver user devices, each reservation request comprising a start time and a duration, and each reservation request associated with a vehicle identifier;
        at a predetermined time before the start time for each reservation request of the plurality of reservation requests, determine an optimized parking schedule based on the status of the plurality of parking space identifiers and the schedule of the plurality of parking space identifiers, and schedule a reservation period by associating the vehicle identifier for the reservation request with a parking space identifier based on the start time, the duration, and the optimized parking schedule;
        update the parking space data based on the optimized parking schedule and each reservation request;
        receive a plurality of non-reserved transaction requests, each non-reserved transaction request associated with a non-reserved vehicle identifier;
        in response to each non-reserved transaction request of the plurality of non-reserved transaction requests, schedule a non-reservation period by associating the non-reserved vehicle identifier for the non-reserved transaction with an available parking space identifier that is not scheduled to a reserved transaction request based on the optimized parking schedule;
        receive a plurality of exit notifications from the driver user devices of the plurality of driver user devices, each exit notification associated with a parking space identifier and an exit time;
        in response to each exit notification of the plurality of exit notifications, modifying a status of the parking space identifier associated with the exit notification;
        in response to each exit notification of the plurality of exit notifications, determine the optimized parking schedule based on the status of the plurality of parking space identifiers and the schedule of the plurality of parking space identifiers;
        update the parking space data based on the optimized parking schedule, wherein updating comprises merging a plurality of fragmented time slots between scheduled reservations; and
        control the plurality of visual display devices based on the updated parking space data, wherein the indicator of a visual display device is controlled to a first state in response to a corresponding parking space identifier being associated with a current available time period based on a corresponding schedule in the parking space data and to a second state in response to the corresponding parking space identifier being associated with an unavailable time period based on the corresponding schedule in the parking space data, and wherein each visual display device corresponding to a parking space identifier associated with a current scheduled time period is configured to display a vehicle identifier associated with the current scheduled time period;
        wherein the plurality of parking spaces are in a parking area that is not deployed with sensors monitoring a presence or absence of the plurality of vehicles in the plurality of parking spaces.

2. The vehicle parking system of claim 1, wherein the first state comprises a first color and the second state comprises a second color.

3. The vehicle parking system of claim 1, wherein the status is based on whether the corresponding parking space is occupied.

4. The vehicle parking system of claim 1, wherein the at least one processor is further programmed or configured to:
    receive at least one violation notification from at least one driver user device of the plurality of driver user devices, the at least one violation notification identifying a parking space identifier and a vehicle identifier; and
    in response to input affirming the at least one violation notification, associating at least one benefit with an account corresponding to the at least one driver user device.

5. The vehicle parking system of claim 1, wherein the vehicle identifier displayed by each visual display device of the plurality of visual display devices comprises at least a portion of a license plate number.

6. The vehicle parking system of claim 1, wherein the current available time period for a parking space identifier comprises a predetermined length of time during which the parking space identifier is not associated with any reservations.

7. The vehicle parking system of claim 1, wherein the at least one processor is further programmed or configured to determine a parking cost for a specified time period based on the plurality of reservation requests and the plurality of exit notifications.

8. The vehicle parking system of claim 1, wherein the indicator of each visual display device comprises a color of the vehicle identifier, such that the first state comprises the vehicle identifier displayed in a first color, and the second state comprises the vehicle identifier displayed in a second color.

9. A method for storing a plurality of vehicles in a plurality of parking spaces, each parking space associated with a unique parking space identifier, wherein each parking space of the plurality of parking spaces comprises a visual display device configured to display an indicator configured to visually represent at least two states and a vehicle identifier, the method comprising:

storing parking space data in a data storage device, the parking space data comprising a plurality of parking space identifiers each associated with a status and a schedule, receiving a plurality of reservation requests from driver user devices of a plurality of driver user devices, each reservation request comprising a start time and a duration, each reservation request associated with a vehicle identifier;

at a predetermined time before the start time for each reservation request of the plurality of reservation requests, determining an optimized parking schedule based on the status of the plurality of parking space identifiers and the schedule of the plurality of parking space identifiers, and schedule a reservation period by associating the vehicle identifier for the reservation request with a parking space identifier based on the start time, the duration, and the optimized parking schedule;

updating the parking space data based on the optimized parking schedule and each reservation request;

receiving a plurality of non-reserved transaction requests, each non-reserved transaction request associated with a non-reserved vehicle identifier;

in response to each non-reserved transaction request of the plurality of non-reserved transaction requests, scheduling a non-reservation period by associating the non-reserved vehicle identifier for the non-reserved transaction with an available parking space identifier that is not scheduled to a reserved transaction request based on the optimized parking schedule;

receiving a plurality of exit notifications from the driver user devices of the plurality of driver user devices, each exit notification associated with a parking space identifier and an exit time;

in response to each exit notification of the plurality of exit notifications, modifying a status of the parking space identifier associated with the exit notification;

in response to each exit notification of the plurality of exit notifications, determining the optimized parking schedule based on the status of the plurality of parking space identifiers and the schedule of the plurality of parking space identifiers;

updating the parking space data based on the optimized parking schedule, wherein updating comprises merging a plurality of fragmented time slots between scheduled reservations; and controlling a plurality of visual display devices based on the updated parking space data, wherein the indicator of a visual display device is controlled to a first state in response to a corresponding parking space identifier being associated with a current available time period based on a corresponding schedule in the parking space data and to a second state in response to the corresponding parking identifier being associated with an unavailable time period based on the corresponding schedule in the parking space data, and wherein each visual display device corresponding to a parking space identifier associated with a current scheduled time period is configured to display a vehicle identifier associated with the current scheduled time period;

wherein the plurality of parking spaces are in a parking area that is not deployed with sensors monitoring a presence or absence of the plurality of vehicles in the plurality of parking spaces.

10. The method of claim 9, wherein the first state comprises a first color and the second state comprises a second color.

11. The method of claim 9, wherein the status is based on whether the corresponding parking space is occupied.

12. The method of claim 9, further comprising:

receiving at least one violation notification from at least one driver user device of the plurality of driver user devices, the at least one violation notification identifying a parking space identifier and a vehicle identifier; and in response to input affirming the at least one violation notification, associating at least one benefit with an account corresponding to the at least one driver user device.

13. The method of claim 9, wherein the vehicle identifier displayed by each visual display device of the plurality of visual display devices comprises a license plate number.

14. The method of claim 9, wherein the current available time period for a parking space identifier comprises a predetermined length of time during which the parking space identifier is not associated with any reservations.

15. The method of claim 9, further comprising a parking cost for a specified time period based on the plurality of reservation requests and the plurality of exit notifications.

16. The method of claim 9, wherein the indicator of each visual display device comprises a color of the vehicle identifier, such that the first state comprises the vehicle identifier displayed in a first color, and the second state comprises the vehicle identifier displayed in a second color.

17. A computer program product for storing a plurality of vehicles in a plurality of parking spaces, each parking space associated with a unique parking space identifier, comprising at least one non-transitory computer-readable medium including program instructions that, when executed by at least one processor, cause the at least one processor to:

store parking space data in a data storage device, the parking space data comprising a plurality of parking space identifiers each associated with a status and a schedule;

receive a plurality of reservation requests from driver user devices of a plurality of driver user devices, each reservation request comprising a start time and a duration, each reservation request associated with a vehicle identifier;

at a predetermined time before the start time for each reservation request of the plurality of reservation requests, determine an optimized parking schedule based on the status of the plurality of parking space identifiers and the schedule of the plurality of parking space identifiers, and schedule a reservation period by associating the vehicle identifier for the reservation request with a parking space identifier based on the start time, the duration, and the optimized parking schedule;

update the parking space data based on the optimized parking schedule and each reservation request;

receive a plurality of non-reserved transaction requests, each non-reserved transaction request associated with a non-reserved vehicle identifier;

in response to each non-reserved transaction request of the plurality of non-reserved transaction requests, schedule a non-reservation period by associating the non-reserved vehicle identifier for the non-reserved transaction with an available parking space identifier that is not scheduled to a reserved transaction request based on the optimized parking schedule;

receive a plurality of exit notifications from the driver user devices of the plurality of driver user devices, each exit notification associated with a parking space identifier and an exit time;

in response to each exit notification of the plurality of exit notifications, modify a status of the parking space identifier associated with the exit notification;

in response to each exit notification of the plurality of exit notifications, determine the optimized parking schedule based on the status of the plurality of parking space identifiers and the schedule of the plurality of parking space identifiers;

update the parking space data based on the optimized parking schedule, wherein updating comprises merging a plurality of fragmented time slots between scheduled reservations; and generate at least one user interface on at least one driver user device of the plurality of driver user devices based on the updated parking space data, wherein the at least one user interface displays a first state in response to a corresponding parking space identifier being associated with a current available time period based on a corresponding schedule in the parking space data and a second state in response to the corresponding parking identifier being associated with an unavailable time period based on the corresponding schedule in the parking space data, and wherein the at least one user interface displays a vehicle identifier for each parking space identifier associated with a current scheduled time period;

wherein the plurality of parking spaces are in a parking area that is not deployed with sensors monitoring a presence or absence of the plurality of vehicles in the plurality of parking spaces.

18. The computer program product of claim 17, wherein the first state comprises a first color and the second state comprises a second color.

19. The computer program product of claim 17, wherein the status is based on whether a corresponding parking space is occupied.

20. The computer program product of claim 17, wherein the program instructions further cause the at least one processor to:

receive at least one violation notification from the at least one driver user device or at least one other driver user device of the plurality of driver user devices, the at least one violation notification identifying a parking space identifier and a vehicle identifier; and in response to input affirming the at least one violation notification, associate at least one benefit with an account corresponding to the at least one driver user device or the at least one other driver user device.

* * * * *